US012406798B2

(12) United States Patent
Sano et al.

(10) Patent No.: US 12,406,798 B2
(45) Date of Patent: Sep. 2, 2025

(54) INDUCTOR COMPONENT

(71) Applicant: Murata Manufacturing Co., Ltd., Kyoto-fu (JP)

(72) Inventors: Rikiya Sano, Nagaokakyo (JP); Masayuki Yoneda, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 819 days.

(21) Appl. No.: 17/476,430

(22) Filed: Sep. 15, 2021

(65) Prior Publication Data

US 2022/0122761 A1 Apr. 21, 2022

(30) Foreign Application Priority Data

Oct. 16, 2020 (JP) ................................ 2020-174615

(51) Int. Cl.

*H01F 27/29* (2006.01)
*H01F 5/00* (2006.01)
*H01F 17/00* (2006.01)
*H01F 27/28* (2006.01)

(52) U.S. Cl.

CPC ........... *H01F 27/292* (2013.01); *H01F 5/003* (2013.01); *H01F 17/0006* (2013.01); *H01F 27/2804* (2013.01)

(58) Field of Classification Search

CPC ............. H01F 17/0013; H01F 27/2804; H01F 2027/2809; H01F 17/0006; H01F 5/003; H01F 27/29; H01F 27/292
USPC .................................................. 336/200, 232
See application file for complete search history.

(56) References Cited

U.S. PATENT DOCUMENTS

| | | | | |
|---|---|---|---|---|
| 9,208,935 | B2 * | 12/2015 | Yoon | H01F 17/0006 |
| 2008/0257488 | A1 * | 10/2008 | Yamano | H01F 41/122 156/274.2 |
| 2014/0049353 | A1 * | 2/2014 | Yoon | H01F 27/292 336/227 |
| 2017/0345558 | A1 * | 11/2017 | Sekiguchi | H01F 27/29 |

(Continued)

FOREIGN PATENT DOCUMENTS

| | | | | |
|---|---|---|---|---|
| JP | 2012079870 | A | * | 4/2012 |
| JP | 2012248628 | A | * | 12/2012 |
| JP | 2014216358 | A | * | 11/2014 |

(Continued)

*Primary Examiner* — Tszfung J Chan
(74) *Attorney, Agent, or Firm* — Studebaker Brackett PLLC

(57) ABSTRACT

An inductor component includes an element body. The element body has a mounting surface and a top surface that are parallel to each other, first and second parallel end surfaces, and first and second parallel side surfaces. An inductor wiring is disposed inside the element body. A first lead-out electrode is connected to a first end of the inductor wiring in an extension direction of the inductor wiring. A second lead-out electrode is connected to a second end of the inductor wiring in the extension direction of the inductor wiring. A lower surface of the first lead-out electrode and a lower surface of the second lead-out electrode are exposed from the mounting surface of the element body. The first lead-out electrode has a substantially quadrangular columnar shape that extends in a height direction. The first lead-out electrode is exposed from the first end surface and the first side surface.

18 Claims, 4 Drawing Sheets

(56) References Cited

U.S. PATENT DOCUMENTS

2019/0088396 A1* 3/2019 Nakashima .......... H01F 27/292

FOREIGN PATENT DOCUMENTS

JP 2019-057580 A 4/2019
KR 2014023141 A * 2/2014 ......... H01F 17/0013

* cited by examiner

INDUCTOR COMPONENT

CROSS-REFERENCE TO RELATED APPLICATION

This application claims benefit of priority to Japanese Patent Application No. 2020-174615 filed Oct. 16, 2020, the entire content of which is incorporated herein by reference.

BACKGROUND

Technical Field

The present disclosure relates to an inductor component.

Background Art

An inductor component disclosed in Japanese Unexamined Patent Application Publication No. 2019-057580 includes an element body. An inductor wiring is disposed inside the element body. A first lead-out electrode is connected to a first end of the inductor wiring. The first lead-out electrode extends in an L-shape across a mounting surface of the element body and a first end surface of the element body that is connected to the mounting surface. The surface of the first lead-out electrode is exposed from the mounting surface and the first end surface of the element body. A second lead-out electrode is connected to a second end of the inductor wiring. Similarly to the first lead-out electrode, the second lead-out electrode also extends in an L-shape across the mounting surface and a second end surface connected to the mounting surface. The surface of the second lead-out electrode is exposed from the mounting surface and the second end surface of the element body.

SUMMARY

When lead-out electrodes extend along the mounting surface and end surfaces of the element body as in the inductor component disclosed in Japanese Unexamined Patent Application Publication No. 2019-057580, the lead-out electrodes cover large areas around the inductor wiring. Therefore, there is a risk that the lead-out electrodes will excessively block magnetic flux generated when a current flows along the inductor wiring.

Accordingly, an aspect of the present disclosure provides an inductor component that includes an element body having a mounting surface and a top surface that are parallel to each other, a first end surface and a second end surface that are parallel to each other, and a first side surface and a second side surface that are parallel to each other; an inductor wiring disposed inside the element body; a first lead-out electrode connected to a first end of the inductor wiring; and a second lead-out electrode connected to a second end of the inductor wiring. Part of the first lead-out electrode and part of the second lead-out electrode are exposed from the mounting surface. The first lead-out electrode has a columnar shape that extends in a direction perpendicular to the mounting surface, and is exposed from the first end surface and the first side surface.

According to this configuration, the first lead-out electrode has a columnar shape and is exposed from the first end surface and the first side surface. In other words, the first lead-out electrode is disposed in the form of a column at a position shifted towards a ridge line between the first end surface and the first side surface. Therefore, the extent to which the inductor wiring disposed inside the element body is covered by the first lead-out electrode can be reduced compared with a case where the first lead-out electrode has an L shape that extends onto the mounting surface and covers a large area of the first end surface. As a result, a situation in which magnetic flux generated when a current flows along the inductor wiring is excessively blocked by the first lead-out electrode is suppressed.

Blocking of magnetic flux by the first lead-out electrode of the inductor component is suppressed.

Other features, elements, characteristics and advantages of the present disclosure will become more apparent from the following detailed description of preferred embodiments of the present disclosure with reference to the attached drawings.

DETAILED DESCRIPTION

Figure 1:
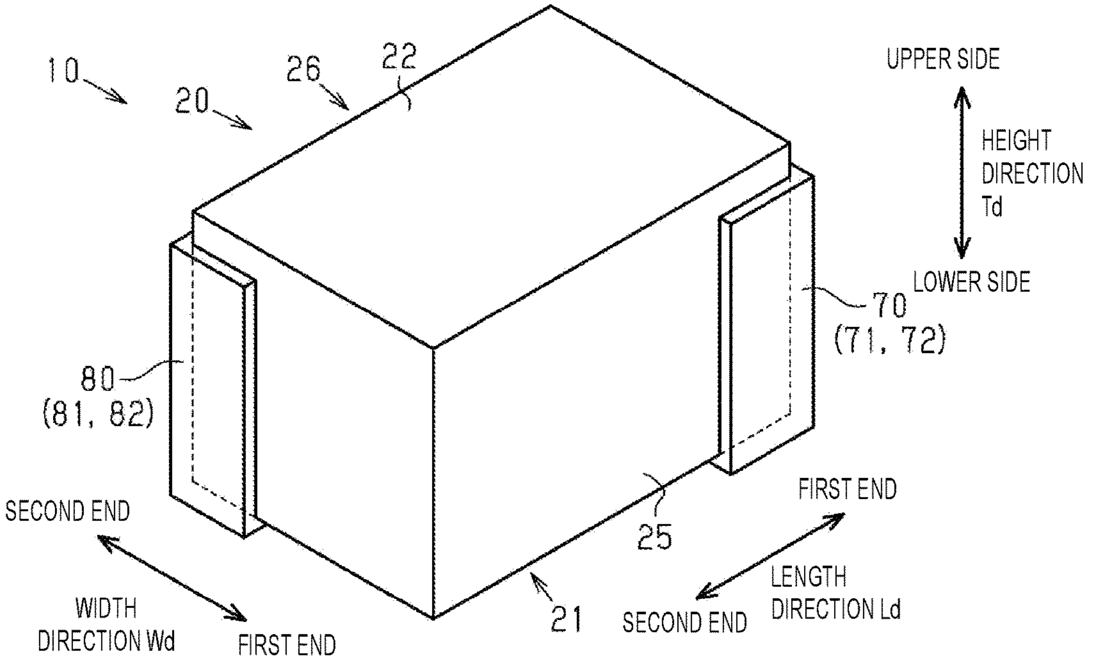
FIG. 1 is a perspective view of an inductor component.

Hereafter, an inductor component according to an embodiment will be described. In the drawings, constituent elements may be illustrated in an enlarged manner for ease of understanding. The dimensional ratios of the constituent elements may differ from the actual ratios or may differ from the ratios in other drawings.

Figure 2:
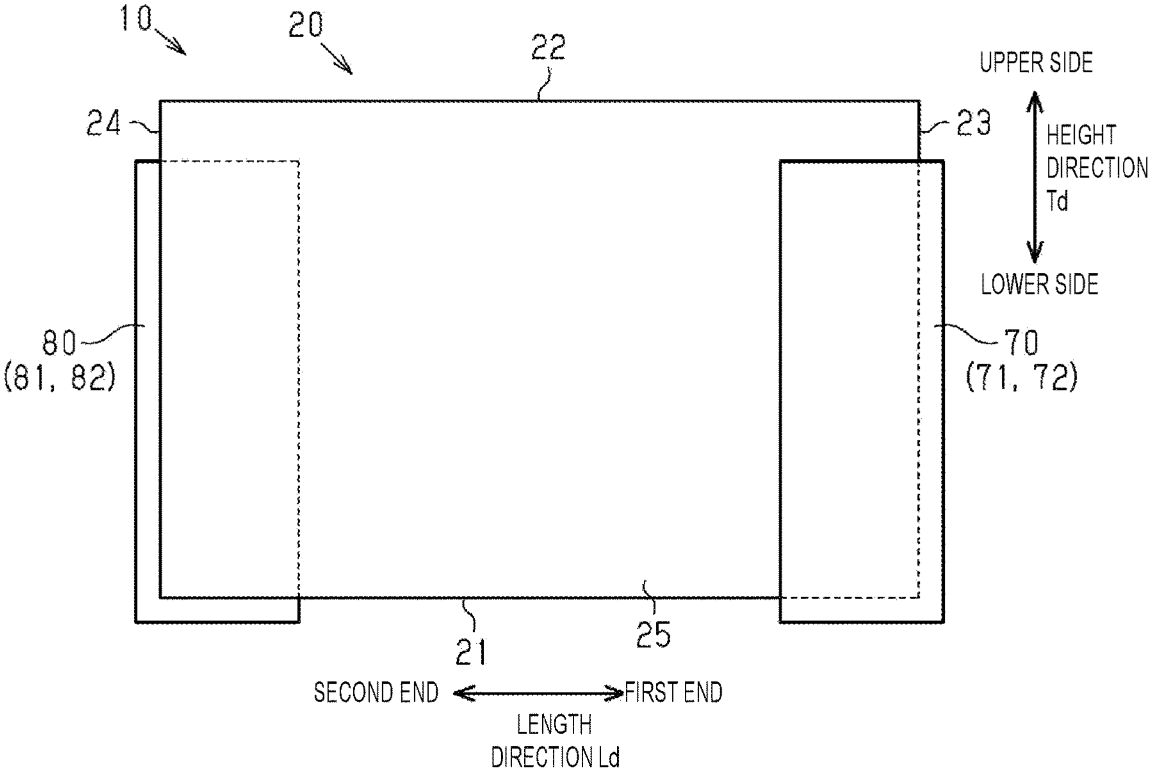
FIG. 2 is a side view of the inductor component.

As illustrated in FIG. 1, an inductor component 10 includes an element body 20. The element body 20 has a substantially rectangular parallelepiped shape on the whole. The element body 20 is composed of an insulator such as glass, resin, or alumina. As illustrated in FIG. 2, among the outer surfaces of the element body 20, one surface is a mounting surface 21 and the surface that faces the mounting surface 21 is a top surface 22. Therefore, the mounting surface 21 and the top surface 22 are parallel to each other. The mounting surface 21 is the surface that faces the circuit board when the inductor component 10 is mounted on a circuit board. The mounting surface 21 and the top surface 22 both have substantially rectangular shapes with substantially the same dimensions. “Substantially the same dimensions” means that the dimensions should be practically identical with errors of around 10 μm, for example, which may be due to manufacturing variations and so on, being acceptable.

In the following description, a direction perpendicular to the mounting surface 21 is taken to be a height direction Td, a side where the top surface 22 is disposed in the height direction Td is referred to as an upper side, and a side where the mounting surface 21 is disposed in the height direction Td is referred to as a lower side. In addition, a longitudinal direction of the mounting surface 21 is taken to be a length direction Ld and a lateral direction of the mounting surface 21 is taken to be a width direction Wd. In addition, as illustrated in FIG. 2, among the outer surfaces of the element body 20 that extend in a direction perpendicular to the mounting surface 21, the surface on the side near a first end in the length direction Ld is taken to be a first end surface 23 and the surface on the side near a second end in the length direction Ld is taken to be a second end surface 24. Therefore, the first end surface 23 and the second end surface 24 are parallel to each other.

Figure 3:
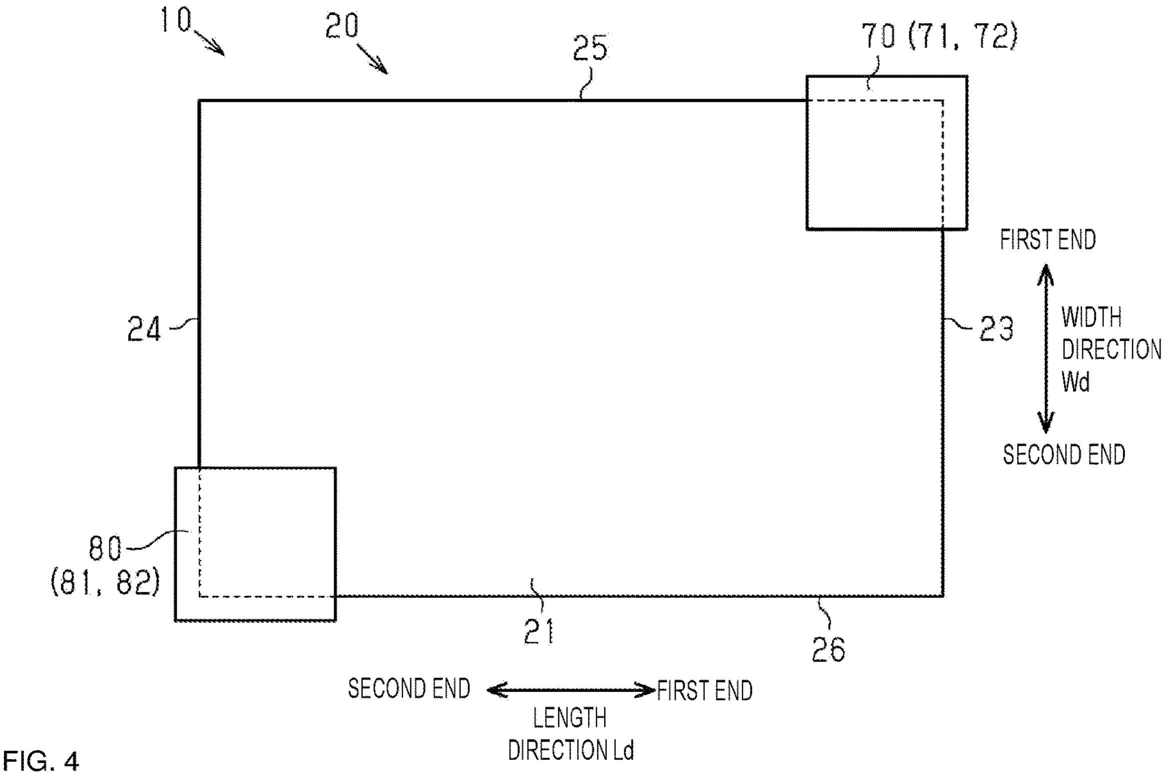
FIG. 3 is a bottom view of the inductor component.

Furthermore, as illustrated in FIG. 3, among the outer surfaces of the element body 20 that extend in a direction perpendicular to the mounting surface 21, the surface on the side near a first end in the width direction Wd is taken to be a first side surface 25 and the surface on the side near a second end in the width direction Wd is taken to be a second side surface 26. Therefore, the first side surface 25 and the second side surface 26 are parallel to each other. In this embodiment, the dimension of the element body 20 in the length direction Ld is around 400 μm. The dimension of the element body 20 in the width direction Wd is around 200 μm. The dimension of the element body 20 in the height direction Td is around 200 μm.

Figure 4:
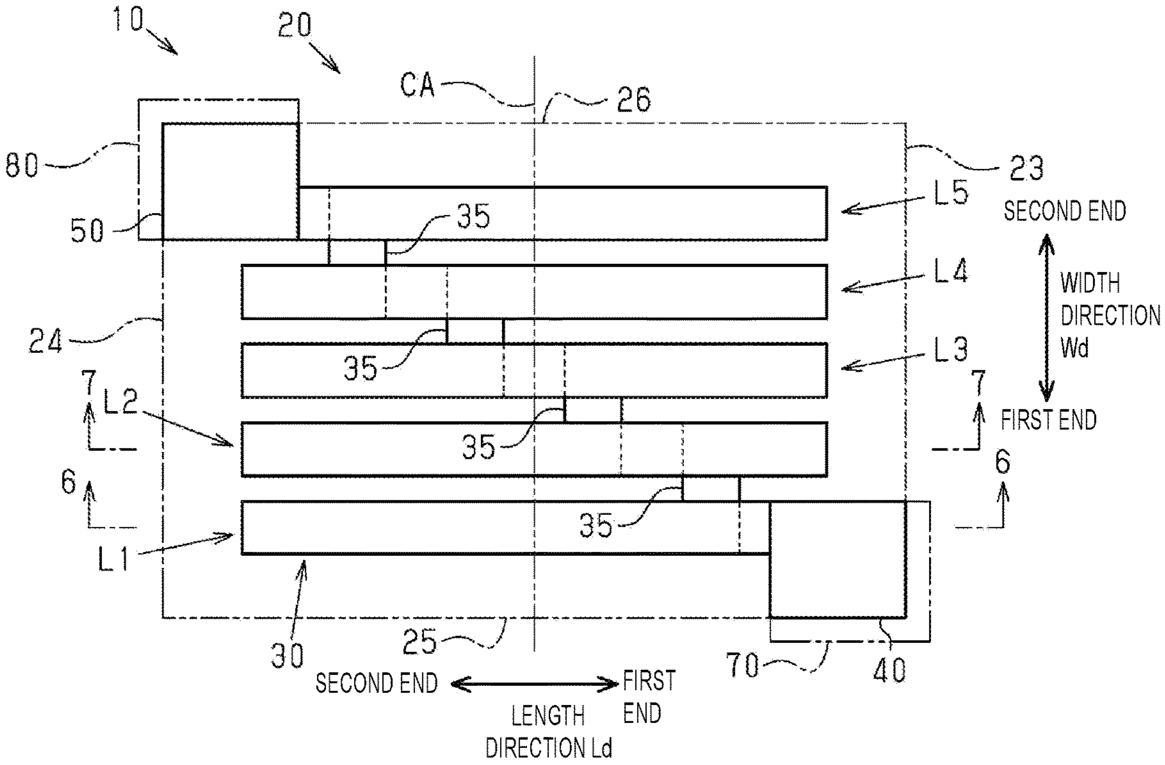
FIG. 4 is a top view of the internal structure of the inductor component.
Figure 5:
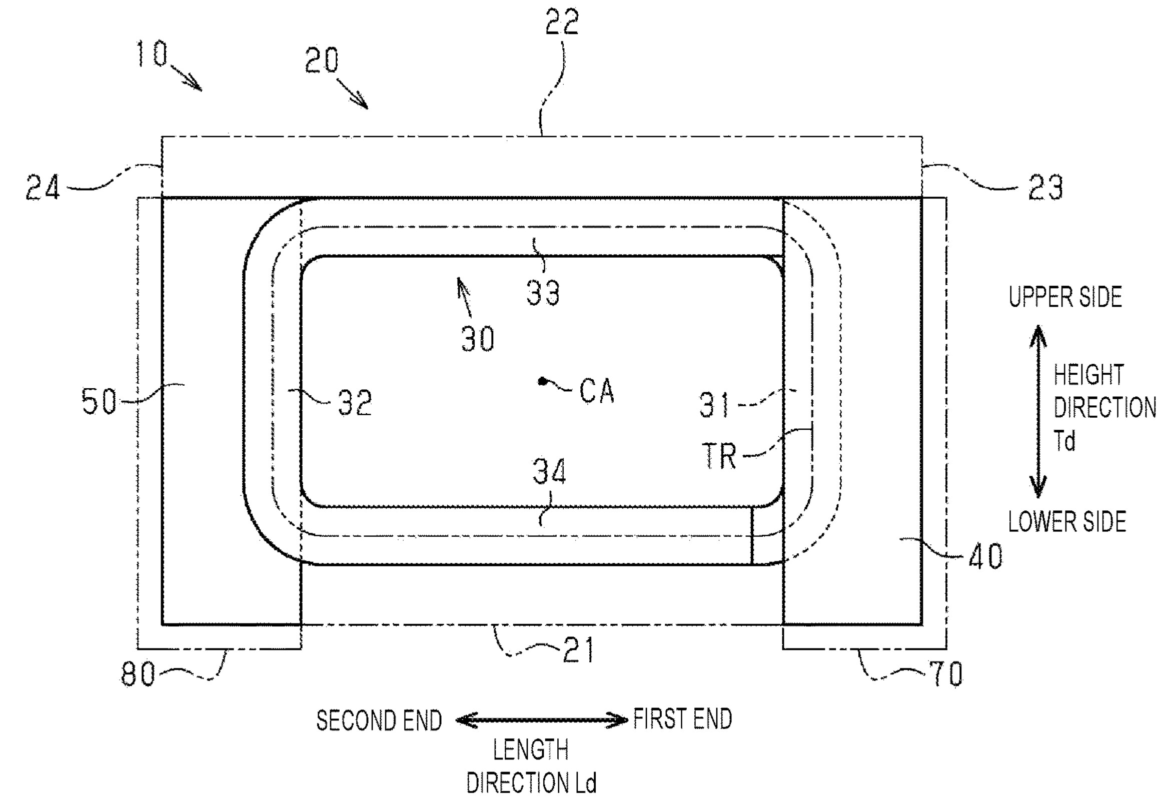
FIG. 5 is a side view of the internal structure of the inductor component.

As illustrated in FIG. 4, the inductor component 10 includes an inductor wiring 30, a first lead-out electrode 40, and a second lead-out electrode 50. The inductor wiring 30 is disposed inside the element body 20. The inductor wiring 30 is composed of an electrically conductive material such as silver or copper. In FIGS. 4 and 5, the internal structure of the element body 20 is illustrated with the element body 20 being depicted in a see-through manner.

As illustrated in FIG. 5, when looking in the width direction Wd, the inductor wiring 30 extends along a substantially quadrangular path TR. When looking in the width direction Wd, the inductor wiring 30 includes first straight parts 31, which correspond to the side near the first end in the length direction Ld, second straight parts 32, which correspond to the side near the second end in the length direction Ld, third straight parts 33, which correspond to the side on the upper side in the height direction Td, and fourth straight parts 34, which correspond to the side on the lower side in the height direction Td. Furthermore, as illustrated in FIG. 4, the inductor wiring 30 is formed of five conductive layers, namely, first to fifth conductor layers L1 to L5, which are stacked in the width direction Wd, and vias 35 that connect the five first to fifth conductive layers L1 to L5 to each other in the width direction Wd.

Figure 6:
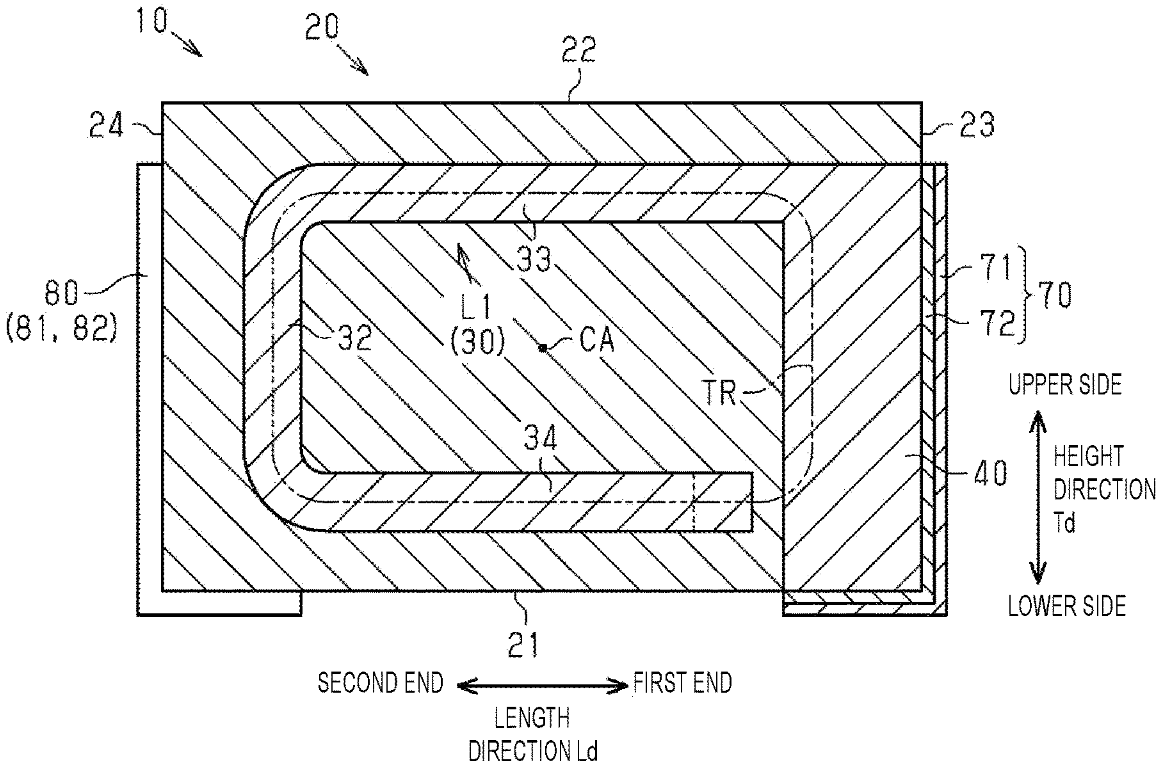
FIG. 6 is a sectional view along line 6-6 in FIG. 4.

As illustrated in FIG. 6, the first conductive layer L1, which is located on the side near the first end in the width direction Wd, includes the second straight part 32, the third straight part 33, and the fourth straight part 34. The second straight part 32, the third straight part 33, and the fourth straight part 34 of the first conductive layer L1 are disposed on a plane parallel to the first side surface 25. The third straight part 33 extends in the length direction Ld on a plane parallel to the first side surface 25. The third straight part 33 has a substantially quadrangular columnar shape. The third straight part 33 is located nearer the upper side in the height direction Td than the center of the element body 20.

The second straight part 32 is connected to an end, which is on the side nearer the second end in the length direction Ld, of the third straight part 33 of the first conductive layer L1. The second straight part 32 has a substantially quadrangular columnar shape and extends in the height direction Td. The dimension of the second straight part 32 in the extension direction thereof is smaller than that of the third straight part 33. The second straight part 32 is located nearer the second end in the length direction Ld than the center of the element body 20.

The fourth straight part 34 is connected to an end, which on the lower side in the height direction Td, of the second straight part 32 of the first conductive layer L1. The fourth straight part 34 has a substantially quadrangular columnar shape and extends in the length direction Ld. The dimension of the fourth straight part 34 of the first conductive layer L1 in the length direction Ld is smaller than the dimension of the third straight part 33 in the length direction Ld. Therefore, an end, which is on the side nearer the first end in the length direction Ld, of the fourth straight part 34 of the first conductive layer L1 is located nearer the second end in the length direction Ld than an end, which is on the side nearer the first end in the length direction Ld, of the third straight part 33 of the first conductive layer L1. As illustrated in FIG. 4, the via 35 extends from an end, which is on the side nearer the first end in the length direction Ld, of the fourth straight part 34 of the first conductive layer L1 toward the second end in the width direction Wd.

The fourth straight part 34 of the second conductive layer L2 is connected to an end, which on the side nearer the second end in the width direction Wd, of the via 35 of the first conductive layer L1 The fourth straight part 34 is connected at first end portion 34*a*, which is a part thereof on the side nearer the first end in the length direction Ld.

Figure 7:
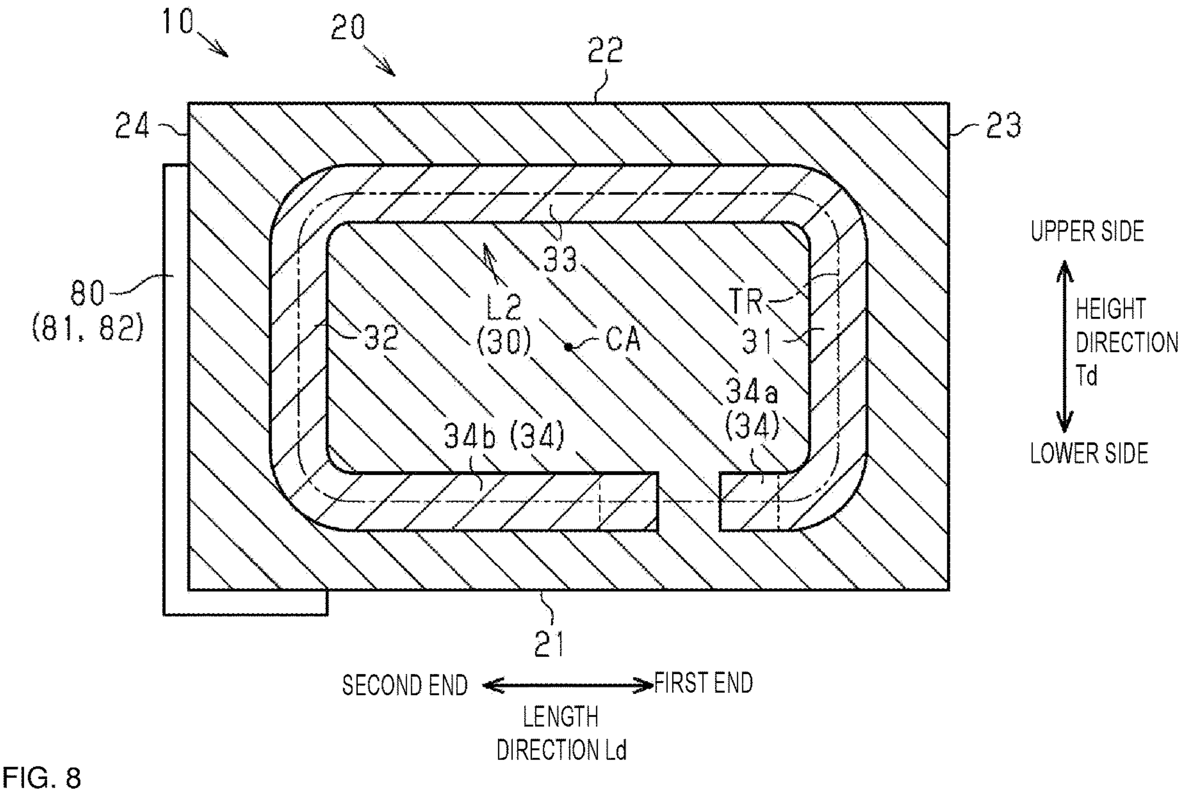
FIG. 7 is a sectional view along line 7-7 in FIG. 4.

As illustrated in FIG. 7, the second conductive layer L2 includes the first straight part 31, the second straight part 32, the third straight part 33, and the fourth straight part 34. The first straight part 31, the second straight part 32, the third straight part 33, and the fourth straight part 34 of the second conductive layer L2 are disposed on a plane parallel to the first side surface 25. The first end portion 34*a* of the second conductive layer L2 extends in the length direction Ld so as to match the extension direction of the fourth straight part 34 of the first conductive layer L1 when looking in the width direction Wd.

The first straight part 31 is connected to an end, which is on the side nearer the first end in the length direction Ld, of the first end portion 34*a* of the second conductive layer L2. The first straight part 31 of the second conductive layer L2 has a substantially quadrangular columnar shape and extends in the height direction Td.

The third straight part 33 is connected to an end, which on the upper side in the height direction Td, of the first straight part 31 of the second conductive layer L2. The third straight part 33 of the second conductive layer L2 overlaps the third straight part 33 of the first conductive layer L1 when looking in the width direction Wd.

The second straight part 32 is connected to an end, which nearer the second end in the length direction Ld, of the third straight part 33 of the second conductive layer L2. The second straight part 32 of the second conductive layer L2 overlaps the second straight part 32 of the first conductive layer L1 when looking in the width direction Wd.

A second end portion 34*b*, which is a part of the fourth straight part 34 on the side nearer the second end in the length direction Ld, is connected to an end, which is on the lower side in the height direction Td, of the second straight part 32 of the second conductive layer L2. The second end portion 34*b* has a substantially quadrangular columnar shape and extends in the length direction Ld. The end of the second end portion 34*b* on the side nearer the first end in the length direction Ld does not reach the first end portion 34*a* and the second end portion 34*b* and the first end portion 34*a* are separated from each other. When looking in the width direction Wd, the first end portion 34*a* of the fourth straight part 34 of the second conductive layer L2 lies within the region occupied by the fourth straight part 34 of the first conductive layer L1.

As illustrated in FIG. 4, the via 35 extends from an end, which is on the side nearer the first end in the length direction Ld, of the second end portion 34*b* of the second conductive layer L2 toward the second end in the width direction Wd. The first end portion 34*a*, which is the part on the side near the first end in the length direction Ld, of the fourth straight part 34 of the third conductive layer L3 of the inductor wiring 30 is connected to this via 35. The third conductive layer L3 includes the first straight part 31, the second straight part 32, the third straight part 33, and the fourth straight part 34. The first straight part 31, the second straight part 32, the third straight part 33, and the fourth straight part 34 of the third conductive layer L3 are disposed on a plane parallel to the first side surface 25. Similarly to the second conductive layer L2, the third conductive layer L3 extends so as to draw a substantially quadrangular path TR formed of the first end portion 34*a*, the first straight part 31, the third straight part 33, the second straight part 32, and the second end portion 34*b*. The position of the gap between the first end portion 34*a* and the second end portion 34*b* in the third conductive layer L3 is nearer the second end in the length direction Ld than the position of the gap between the first end portion 34*a* and the second end portion 34*b* in the second conductive layer L2.

The via 35 extends from an end, which is on the side nearer the first end in the length direction Ld, of the second end portion 34*b* of the third conductive layer L3 toward the second end in the width direction Wd. The first end portion 34*a*, which is the part on the side nearer the first end in the length direction Ld, of the fourth straight part 34 of the fourth conductive layer L4 is connected to this via 35. The fourth conductive layer L4 includes the first straight part 31, the second straight part 32, the third straight part 33, and the fourth straight part 34. The first straight part 31, the second straight part 32, the third straight part 33, and the fourth straight part 34 of the fourth conductive layer L4 are disposed on a plane parallel to the first side surface 25. Similarly to the third conductive layer L3, the fourth conductive layer L4 extends so as to draw a substantially quadrangular path TR formed of the first end portion 34*a*, the first straight part 31, the third straight part 33, the second straight part 32, and the second end portion 34*b*. The position of the gap between the first end portion 34*a* and the second end portion 34*b* in the fourth conductive layer L4 is nearer the second end in the length direction Ld than the position of the gap between the first end portion 34*a* and the second end portion 34*b* in the third conductive layer L3.

The via 35 is connected from an end, which is on the side nearer the first end in the length direction Ld, of the second end portion 34*b* of the fourth conductive layer L4 toward the second end in the width direction Wd. The first end portion 34*a*, which is the part on the side nearer the first end in the length direction Ld, of the fourth straight part 34 of the fifth conductive layer L5 is connected to this via 35. The fifth conductive layer L5 includes the first straight part 31, the third straight part 33, and the fourth straight part 34. The first straight part 31, the third straight part 33, and the fourth straight part 34 of the fifth conductive layer L5 are disposed on a plane parallel to the first side surface 25. The fifth conductive layer L5 extends so as to draw a substantially quadrangular path TR formed of the first end portion 34*a*, the first straight part 31, and the third straight part 33.

In this embodiment, in the inductor wiring 30, each connection part where the first straight part 31 and the third straight part 33 are connected to each other has a substantially chamfered shape when looking in the width direction Wd. Specifically, the surface of the connection part between the first straight part 31 and the third straight part 33 that is on the side nearer a winding center axis CA of the inductor wiring 30 is a curved surface. Furthermore, the surface of the connection part between the first straight part 31 and the third straight part 33 that is on the opposite side from the winding center axis CA is also a curved surface. Similarly, the surfaces of the connection part between the first straight part 31 and the fourth straight part 34, the connection part between the second straight part 32 and the third straight part 33, and the connection part between the second straight part 32 and the fourth straight part 34 that are on the side nearer the winding center axis CA of the inductor wiring 30 are curved surfaces. In addition, the surface of each connection part on the opposite side from the winding center axis CA of the inductor wiring 30 is also a curved surface.

Thus, the inductor wiring 30 is substantially shaped like a wound coil formed of the first to fifth conductor layers L1 to L5 and the vias 35 connecting the first to fifth conductor layers L1 to L5 to each other. The winding center axis CA of the inductor wiring 30 wound in a substantially coil-like shape is aligned with the width direction Wd. In other words, the winding center axis CA is perpendicular to the first side surface 25. The winding center axis CA is located substantially at the center of the element body 20 when looking in the width direction Wd.

Furthermore, the distance between the first straight parts 31 and the second straight parts 32 is greater than the distance between the third straight parts 33 and the fourth straight parts 34 when looking in the width direction Wd. Therefore, in this embodiment, the inner diameter of the inductor wiring 30 along a straight line passing through the winding center axis CA and perpendicular to the first end surface 23 is greater than the inner diameter of the inductor wiring 30 along a straight line passing through the winding center axis CA and perpendicular to the mounting surface 21.

As illustrated in FIG. 4, the first lead-out electrode 40 is connected to a first end, in the extension direction, of the inductor wiring 30, that is, the end, which is nearer the first end in the length direction Ld, of the third straight part 33 of the first conductive layer L1. As illustrated in FIG. 5, the first lead-out electrode 40 has a substantially quadrangular columnar shape that extends in the height direction Td. The upper end of the first lead-out electrode 40 is flush with the upper surface of the third straight part 33. As illustrated in FIG. 4, the first lead-out electrode 40 has a substantially square shape when looking in the height direction Td. The dimension of the first lead-out electrode 40 in the length direction Ld is less than or equal to ¼ the dimension of the element body 20 in the length direction Ld, and is 48 μm in this embodiment. Furthermore, the dimension of the first lead-out electrode 40 in the width direction Wd is less than or equal to ¼ the dimension of the element body 20 in the width direction Wd, and is 48 μm in this embodiment. In this embodiment, the length direction Ld is a direction that is parallel to both the mounting surface 21 and the first side surface 25.

As illustrated in FIG. 5, the dimension of the first lead-out electrode 40 in the height direction Td is greater than ½ the dimension of the element body 20 in the height direction Td and is 185 μm in this embodiment. The lower surface of the first lead-out electrode 40 in the height direction Td is flush with the mounting surface 21 of the element body 20. Therefore, the lower surface of the first lead-out electrode 40 in the height direction Td is exposed from the mounting surface 21 of the element body 20. On the other hand, the upper surface of the first lead-out electrode 40 in the height direction Td is located inside the element body 20. Since the dimension of the element body 20 in the height direction Td is 200 μm, a distance of 15 μm is secured as the distance from the top surface 22 of the element body 20 to the end, on the side nearer the top surface 22, of the first lead-out electrode 40 in the height direction Td. In this embodiment, the first lead-out electrode 40 has a substantially quadrangular columnar shape, and therefore, the maximum dimension of the first lead-out electrode 40 in the height direction Td is equal to the dimension of the first lead-out electrode 40 in the height direction Td.

As illustrated in FIG. 4, when looking in the height direction Td, one corner out of the four corners of the square shape of the first lead-out electrode 40 is aligned with a corner where an imaginary plane containing the first end surface 23 and an imaginary plane containing the first side surface 25 are connected to each other. Among the four side surfaces of the quadrangular columnar shape of the first lead-out electrode 40, the side surface that is nearer the first end in the length direction Ld is flush with the first end surface 23. Therefore, the side surface of the first lead-out electrode 40 that is nearer the first end in the length direction Ld is exposed from the first end surface 23 of the element body 20. In addition, the dimension, in the width direction Wd, of the part of the first lead-out electrode 40 that is exposed from the first end surface 23 is less than or equal to ¼ the dimension of the first end surface 23 in the width direction Wd. Therefore, when looking in the length direction Ld, the first lead-out electrode 40 overlaps the inductor wiring 30 only in a region of the first end surface 23 nearer the first side surface 25 than the center of the first end surface 23.

Among the four side surfaces of the quadrangular columnar shape of the first lead-out electrode 40, the side surface that is nearer the first end in the width direction Wd is flush with the first side surface 25. Therefore, the side surface of the first lead-out electrode 40 that is nearer the first end in the width direction Wd is exposed from the first side surface 25 of the element body 20. In other words, the first lead-out electrode 40 is exposed from the first end surface 23 and the first side surface 25 of the element body 20. On the other hand, the first lead-out electrode 40 is not exposed from the second end surface 24 and the second side surface 26 of the element body 20.

In addition, the second lead-out electrode 50 is connected to a second end, in the extension direction, of the inductor wiring 30, that is, the end, which is nearer the second end in the length direction Ld, of the third straight part 33 of the fifth conductive layer L5. The second lead-out electrode 50 has substantially the same shape as the first lead-out electrode 40. As illustrated in FIG. 5, the second lead-out electrode 50 has a substantially quadrangular columnar shape that extends in the height direction Td. The upper end of the second lead-out electrode 50 is flush with the upper surface of the third straight part 33. As illustrated in FIG. 4, the second lead-out electrode 50 has a substantially square shape when looking in the height direction Td. The dimension of the second lead-out electrode 50 in the length direction Ld is less than or equal to ¼ the dimension of the element body 20 in the length direction Ld, and is 48 μn in this embodiment. Furthermore, the dimension of the second lead-out electrode 50 in the width direction Wd is less than or equal to ¼ the dimension of the element body 20 in the width direction Wd, and is 48 μm in this embodiment.

As illustrated in FIG. 5, the dimension of the second lead-out electrode 50 in the height direction Td is greater than ½ the dimension of the element body 20 in the height direction Td and is 185 μm in this embodiment. The lower surface of the second lead-out electrode 50 in the height direction Td is flush with the mounting surface 21 of the element body 20. Therefore, the lower surface of the second lead-out electrode 50 in the height direction Td is exposed from the mounting surface 21 of the element body 20. On the other hand, the upper surface of the second lead-out electrode 50 in the height direction Td is located inside the element body 20. Since the dimension of the element body 20 in the height direction Td is 200 μm, a distance of 15 μm is secured as the distance from the top surface 22 of the element body 20 to the end, on the side nearer the top surface 22, of the second lead-out electrode 50 in the height direction Td. In this embodiment, the second lead-out electrode 50 has a substantially quadrangular columnar shape, and therefore, the maximum dimension of the second lead-out electrode 50 in the height direction Td is equal to the dimension of the second lead-out electrode 50 in the height direction Td.

As illustrated in FIG. 4, when looking in the height direction Td, one corner out of the four corners of the square shape of the second lead-out electrode 50 is aligned with a corner where an imaginary plane containing the second end surface 24 and an imaginary plane containing the second side surface 26 are connected to each other. Among the four side surfaces of the quadrangular columnar shape of the second lead-out electrode 50, the side surface that is nearer the second end in the length direction Ld is flush with the second end surface 24. Therefore, the surface of the second lead-out electrode 50 that is nearer the second end in the length direction Ld is exposed from the second end surface 24 of the element body 20. In addition, the dimension, in the width direction Wd, of the part of the second lead-out electrode 50 that is exposed from the second end surface 24 is less than or equal to ¼ the dimension of the second end surface 24 in the width direction Wd. Therefore, when looking in the length direction Ld, the second lead-out electrode 50 overlaps the inductor wiring 30 only in a region of the second end surface 24 nearer the second side surface 26 than the center of the second end surface 24.

Among the four side surfaces of the quadrangular columnar shape of the second lead-out electrode 50, the side surface that is nearer the second end in the width direction Wd is flush with the second side surface 26. Therefore, the surface of the second lead-out electrode 50 that is nearer the second end in the width direction Wd is exposed from the second side surface 26 of the element body 20. In other words, the second lead-out electrode 50 is exposed from the second end surface 24 and the second side surface 26. On the other hand, the second lead-out electrode 50 is not exposed from the first end surface 23 and the first side surface 25.

Here, in the element body 20, when looking in the width direction Wd, part of the first lead-out electrode 40 overlaps the first straight parts 31 of the inductor wiring 30. In other words, when looking in the width direction Wd, the first straight parts 31 of the inductor wiring 30 are positioned so as to overlap the first lead-out electrode 40. The extension direction of the first lead-out electrode 40 is parallel to the extension direction of the first straight parts 31. In addition, among the four side surfaces of the first lead-out electrode 40, the surface that is on the side nearer the second end in the length direction Ld is located on the same plane as the surfaces of the first straight parts 31 that are on the side nearer the second end in the length direction Ld. In other words, when looking in the width direction Wd, the edge of the first lead-out electrode 40 on the side nearer the winding center axis CA of the inductor wiring 30 is aligned with the edges of the first straight parts 31 on the side nearer the winding center axis CA. "Aligned" means substantial aligned and, for example, manufacturing errors and so forth of around 10 μm are permitted.

Here, in the element body 20, when looking in the width direction Wd, part of the second lead-out electrode 50 overlaps the second straight parts 32 of the inductor wiring 30. In other words, when looking in the width direction Wd, the second straight parts 32 of the inductor wiring 30 are positioned so as to overlap the second lead-out electrode 50. The extension direction of the second lead-out electrode 50 is parallel to the extension direction of the second straight parts 32. In addition, among the four side surfaces of the second lead-out electrode 50, the surface that is on the side nearer the first end in the length direction Ld is located on the same plane as the surfaces of the second straight parts 32 that are on the side nearer the first end in the length direction Ld. In other words, when looking in the width direction Wd, the edge of the second lead-out electrode 50 on the side nearer the winding center axis CA of the inductor wiring 30 is aligned with the edges of the second straight parts 32 on the side nearer the winding center axis CA.

As a result of the above-described positional relationship, the distance between the first lead-out electrode 40 and the second lead-out electrode 50 is the same as the distance between the first straight parts 31 and the second straight parts 32 of the inductor wiring 30 when looking in the width direction Wd. In other words, when looking in the width direction Wd, the distance between the first lead-out electrode 40 and the second lead-out electrode 50 is equal to the inner diameter of the inductor wiring 30 along a straight line passing through the winding center axis CA of the inductor wiring 30 and perpendicular to the first end surface 23. "The distance is equal" means that the distance should be substantially equal and, for example, manufacturing errors and so forth of around 10 μm are acceptable.

Out of the outer surfaces of the first lead-out electrode 40, a first coating layer 70 is stacked on the surfaces that are exposed from the outer surfaces of the element body 20. In other words, the first coating layer 70 is provided on the mounting surface 21, the first end surface 23, and the first side surface 25. The first coating layer 70 has a two-layer structure consisting of a nickel layer 71 and a tin layer 72. The nickel layer 71 composed of nickel is stacked on the surfaces of the first lead-out electrode 40. The tin layer 72 composed of tin is stacked on the surfaces of the nickel layer 71.

Out of the outer surfaces of the second lead-out electrode 50, a second coating layer 80 is stacked on the surfaces that are exposed from the outer surfaces of the element body 20. In other words, the second coating layer 80 is provided on the mounting surface 21, the second end surface 24, and the second side surface 26. The second coating layer 80 has a two-layer structure consisting of a nickel layer 81 and a tin layer 82. The nickel layer 81 composed of nickel is stacked on the surfaces of the second lead-out electrode 50. The tin layer 82 composed of tin is stacked on the surfaces of the nickel layer 81.

As illustrated in FIG. 3, the first lead-out electrode 40 and the second lead-out electrode 50 are disposed on a diagonal of the quadrangular shape when the inductor component 10 is viewed in the height direction Td. Therefore, the inductor component 10 has a two-fold symmetrical structure with the center of the mounting surface 21 as the center of rotational symmetry. Therefore, with respect to the position where the first lead-out electrode 40 is exposed from the element body 20, the second lead-out electrode 50 is exposed from the element body 20 at a two-fold rotationally symmetrical position with the center of the mounting surface 21 being the center of rotation and the height direction Td being the axis of rotation. In addition, as illustrated in FIG. 4, the internal structure of the element body 20 of the inductor component 10 also has a two-fold symmetrical structure with the center of the element body 20 being the center of rotational symmetry when looking in the height direction Td.

Next, the actions and effects of the above-described embodiment will be described. Effects described below that are common to both the first lead-out electrode 40 and the second lead-out electrode 50 are described using the first lead-out electrode 40 as a representative example.

(1) According to the above-described embodiment, the first lead-out electrode 40 has a substantially columnar shape. In addition, the first lead-out electrode 40 is exposed from the first end surface 23 and the first side surface 25. In other words, the first lead-out electrode 40 is disposed in the form of a column at a position shifted towards the ridge line between the first end surface 23 and the first side surface 25. Therefore, the extent to which the inductor wiring 30 disposed inside the element body 20 is covered by the first lead-out electrode 40 can be reduced compared with a hypothetical case where the first lead-out electrode 40 has an L shape that extends onto the mounting surface 21 and covers a large area of the first end surface 23. As a result, a situation in which magnetic flux generated when a current flows along the inductor wiring 30 is excessively blocked by the first lead-out electrode 40 is suppressed.

(2) According to the above-described embodiment, the maximum dimension of the first lead-out electrode 40 in the height direction Td is greater than ½ the dimension of the element body 20 in the height direction Td. Therefore, the upper end of the first lead-out electrode 40 is located reasonably close to the top surface 22 of the element body 20. As a result, the first lead-out electrode 40 enables a conductive part to be led out to the mounting surface 21 even when the first end of the inductor wiring 30 in the extension direction is disposed reasonably close to the top surface 22.

(3) According to the above-described embodiment, the dimension of the first lead-out electrode 40 in the width direction Wd is less than or equal to ¼ the dimension of the element body 20 in the width direction Wd. Therefore, when looking in the height direction Td, the region occupied by the first lead-out electrode 40 is reasonably small. As a result, the degree of freedom when designing the wiring path of the inductor wiring 30 inside the element body 20 is increased.

(4) According to the above-described embodiment, the dimension of the first lead-out electrode 40 in the length direction Ld is greater than or equal to 10 μm. Therefore, the size of the first lead-out electrode 40 can be guaranteed even if the dicing accuracy is somewhat low when the element body 20 is divided into individual pieces during manufacture of the inductor component 10.

(5) According to the above-described embodiment, the first coating layer 70 is stacked on the surfaces of the first lead-out electrode 40 that are exposed from the element body 20. Therefore, when mounting the inductor component 10, it is easy to align the inductor component 10 by using the parts protruding from the surface of the element body 20 as a marker.

(6) According to the above-described embodiment, the first coating layer 70 has a two-layer structure consisting of the nickel layer 71 composed of nickel and the tin layer 72 composed of tin and stacked on the surfaces of the nickel layer 71. Therefore, damage to the first lead-out electrode 40 caused by melted solder can be prevented by the heat resistance of the nickel layer 71. In addition, the solder adhesion strength can be increased due to the solder wettability of the tin layer 72 being reasonably high.

(7) According to the above-described embodiment, when looking in the height direction Td, the inductor component 10 has a two-fold symmetrical structure with the center of the element body 20 being the center of rotational symmetry. In addition, the internal structure of the element body 20 also has a two-fold symmetrical structure with the center of the element body 20 being the center of rotational symmetry when looking in the height direction Td. Therefore, even if the inductor components 10 are mounted so that the length directions Ld thereof face in opposite directions, the characteristics of the inductor components 10 will be identical. As a result, the orientation of the length direction Ld does not matter when mounting the inductor component 10.

(8) According to the above-described embodiment, the winding center axis CA of the inductor wiring 30 extends parallel to the width direction Wd. Therefore, when the inductor component 10 is mounted on a circuit board, blocking of magnetic flux at the circuit substrate connected to the mounting surface 21 side of the inductor component 10 can be suppressed compared with a case where the winding center axis CA of the inductor wiring 30 is perpendicular to the mounting surface 21.

(9) According to the above-described embodiment, the first lead-out electrode 40 is exposed in a region spanning from the first end surface 23 to the first side surface 25. In other words, the first lead-out electrode 40 is disposed close to the first end in the width direction Wd. Therefore, for example, there is no need to make the paths of the first to fifth conductive layers L1 to L5 of the inductor component 10 different from each other in order to secure the distance to the first lead-out electrode 40, and it is easy to design a path in which the inner diameter of the inductor wiring 30 is the same in each layer.

(10) According to this embodiment, when looking in the width direction Wd, the first lead-out electrode 40 overlaps the first straight parts 31 of the inductor wiring 30. In other words, the part of the element body 20 that is nearer the second end in the width direction Wd than the first lead-out electrode 40 is effectively utilized as a space in which to place the inductor wiring 30.

(11) According to the above-described embodiment, when looking in the width direction Wd, the edge of the first lead-out electrode 40 on the side nearer the winding center axis CA of the inductor wiring 30 is aligned with the edges of the first straight parts 31 on the side nearer the winding center axis CA. Therefore, a situation in which magnetic flux passing through the inside of the inductor wiring 30 hits the first lead-out electrode 40 can be avoided.

(12) According to the above-described embodiment, when looking in the width direction Wd, the distance between the first lead-out electrode 40 and the second lead-out electrode 50 is equal to the inner diameter of the inductor wiring 30 along a straight line passing through the winding center axis CA of the inductor wiring 30 and perpendicular to the first end surface 23. In other words, the inner diameter of the inductor wiring 30 is maximized while avoiding a situation in which magnetic flux passing through the inside of the inductor wiring 30 hits the second lead-out electrode 50.

(13) According to the above-described embodiment, the inner diameter of the inductor wiring 30 along a straight line passing through the winding center axis CA and perpendicular to the first end surface 23 is greater than the inner diameter of the inductor wiring 30 along a straight line passing through the winding center axis CA and perpendicular to the mounting surface 21. Therefore, in the element body 20, which is longer in the length direction Ld than in the height direction Td, when looking in the width direction Wd, the length of wiring path of the inductor wiring 30 can be increased as a result of the diameter of the wiring path of the inductor wiring 30 being increased.

(14) According to the above-described embodiment, each layer of the second to fourth conductive layers L2 to L4 of the inductor wiring 30 includes a first straight part, a second straight part, a third straight part, and a fourth straight part, which are disposed on planes that are parallel to the first side surface 25 inside the element body 20. Therefore, the path length of the inductor wiring 30 per unit volume of the element body 20 can be increased.

(15) According to the above-described embodiment, in the inductor wiring 30, the surfaces of the connection part between the first straight part 31 and the third straight part 33, the connection part between the first straight part 31 and the fourth straight part 34, the connection part between the second straight part 32 and the third straight part 33, and the connection part between second straight part 32 and the fourth straight part 34 that are on the side near the winding center axis CA of the inductor wiring 30 are curved surfaces. Therefore, when the current flowing along the inductor wiring 30 changes direction by 90 degrees, current loss can be suppressed due to the direction changing gradually.

(16) According to the above-described embodiment, therefore, when looking in the length direction Ld, the first lead-out electrode 40 overlaps the inductor wiring 30 only in a region of the first end surface 23 that is nearer the first side surface 25 than the center of the first end surface 23. In this case, the first lead-out electrode 40 is not disposed at a position where the inductor wiring 30 does not overlap the first lead-out electrode 40 when looking in the length direction Ld. Therefore, the first lead-out electrode 40 is less likely to block magnetic flux generated when a current flows along the inductor wiring 30.

The above-described embodiment can be modified in the following ways. The embodiment and the following modifications can be combined with each other to the extent that they are not technically inconsistent.

The size of the element body 20 is not limited to the example given in the embodiment. For example, the dimensions of the element body 20 in the respective directions may be a dimension of 600 μm in the length direction Ld, a dimension of 300 μm in the width direction Wd, and a dimension of 300 μm in the height direction Td, or may be a dimension of 250 μm in the length direction Ld, a dimension of 125 μm in the width direction Wd, and a dimension of 125 μm in the height direction Td. In addition, for example, the dimension in the height direction Td and the dimension in the width direction Wd do not have to be equal to each other and the dimension in the height direction Td may be larger than the dimension in the length direction Ld.

The shape of the inductor wiring 30 does not have to be a quadrangular columnar shape. The shape of the inductor wiring 30 may be a polygonal columnar shape other than a quadrangular columnar shape or may be a cylindrical shape.

It is not essential that there be a distance from the lower ends of the fourth straight parts 34 of the inductor wiring 30 to the mounting surface 21, but this distance is preferably from around 10 μm to around 20 μm. The path TR of the inductor wiring 30 can be made larger, the more the distance from the lower ends of the fourth straight parts 34 to the mounting surface 21 is decreased. On the other hand, when the element body 20 is divided into individual pieces when manufacturing the inductor component 10, the risk of the inductor wiring 30 being exposed from the outer surface of the element body 20 is suppressed even when the dicing precision is quite low by making the distance from the lower end of the fourth straight part 34 to the mounting surface 21 reasonably large. In addition, similarly, it is also not essential that there be a distance from the upper ends of the third straight parts 33 of the inductor wiring 30 to the top surface 22, but this distance is preferable from around 10 μm to around 20 μm.

In each connection part between the first straight part 31 and the third straight part 33, the surface on the side nearer the winding center axis CA of the inductor wiring 30 and the surface on the opposite side from the winding center axis CA do not have to be curved surfaces. For example, the surfaces may have an angle that bends through 90 degrees, or the first straight part 31 and the third straight part 33 may be connected by an inclined part that is inclined to both the first straight part 31 and the third straight part 33. In this case, it is easier to increase the length of the inductor wiring 30 by making the straight parts of the first and third straight parts 31 and 33 longer. This point similarly applies to the connection parts between the other straight parts.

Regarding the inductor wiring 30, it is not necessary that all of the first to fourth straight parts 34 be disposed on a plane parallel to the first side surface 25 inside the element body 20. For example, only the third straight part 33 and the second straight part 32 may be disposed in the first conductive layer L1 and only the fourth straight part 34 and the first straight part 31 may be disposed in the second conductive layer L2. In this way, even if the inductor wiring 30 is formed so that only some of the straight parts are disposed in a single conductive layer, the inductor wiring 30 may be wound as a whole.

In the inductor wiring 30, the distance between the third straight part 33 and the fourth straight part 34 may be greater than or equal to the distance between the first straight part 31 and the second straight part 32 when looking in the width direction Wd. The distances between the straight parts may be changed as appropriate in accordance with the shape of the element body 20 and the required electrical characteristics.

The positional relationship between the first straight parts 31 and the first lead-out electrode 40 is not limited to the example given in the embodiment. The surfaces of the first straight parts 31 on the side nearer the winding center axis CA do not have to be disposed on the same plane as the surface of the first lead-out electrode 40 on the side nearer the second end in the length direction Ld. In addition, for example, the first straight parts 31 do not have to overlap the first lead-out electrode 40 when looking in the width direction Wd. This point similarly applies to the positional relationship between the second straight parts 32 and the second lead-out electrode 50.

The winding center axis CA of the inductor wiring 30 does not have to extend in a direction perpendicular to the first side surface 25. For example, the winding center axis CA may extend in a direction perpendicular to the first end surface 23 or may extend in a direction perpendicular to the mounting surface 21. When the winding center axis CA extends in a direction perpendicular to any of the outer surfaces of the element body 20, it is easy to wind the inductor wiring 30 having a uniform diameter inside the element body 20.

The shape of the inductor wiring 30 when looking in the width direction Wd, i.e., the path TR of the inductor wiring 30 is not limited to the example given in the embodiment. For example, the path TR of the inductor wiring 30 may have a polygonal shape other than a quadrangular shape or may have an elliptical or circular shape when looking in the width direction Wd.

The shape of the inductor wiring 30 is not limited to the example given in the embodiment. For example, the inductor wiring 30 does not have to be shaped like a coil and may instead have a straight line shape or a meandering shape.

Figure 8:
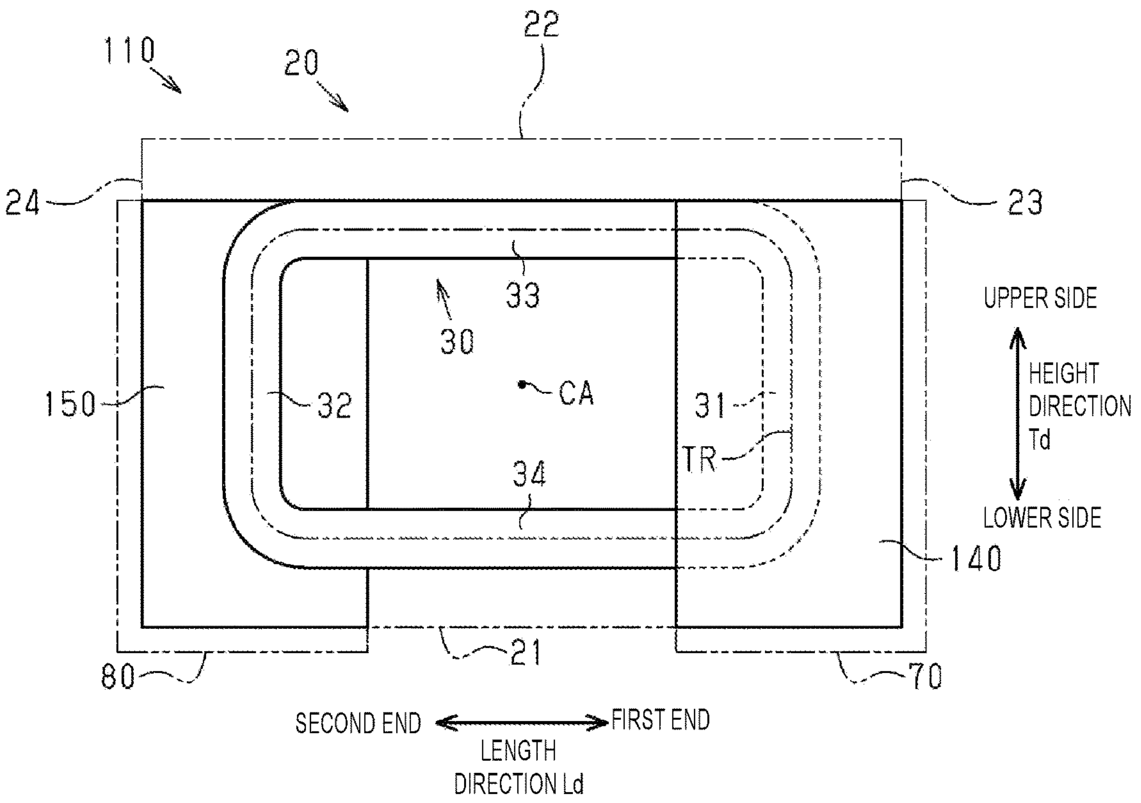
FIG. 8 is a side view of the internal structure of an inductor component of a modification.

The dimensions of the first lead-out electrode 40 are not limited to the examples given in the embodiment. The smaller the dimension of the first lead-out electrode 40 in each direction, the smaller the amount of magnetic flux that will be blocked by the first lead-out electrode 40. On the other hand, for example, it is preferable that the dimensions of the first lead-out electrode 40 in the width direction Wd and the length direction Ld be around 10 μm or higher in order to dice the element body 20. In addition, in the example illustrated in FIG. 8, in an inductor component 110, the dimension of a first lead-out electrode 140 in the length direction Ld is greater than ¼ the dimension of the element body 20 in the length direction Ld. In particular, in this example, the dimension of the first lead-out electrode 140 in the length direction Ld is greater than the distance from the first end surface of the element body 20 in the length direction Ld to the surfaces of the first straight parts 31 on the side nearer the winding center axis CA. Similarly, the dimension of a second lead-out electrode 150 in the length direction Ld is greater than ¼ of the dimension of the element body 20 in the length direction Ld. In this example, the edge of the first lead-out electrode 140 on the side near the winding center axis CA is located nearer the winding center axis CA than the edges of the first straight parts 31 on the side near the winding center axis CA. In addition, the edge of the second lead-out electrode 150 on the side near the winding center axis CA is located nearer the winding center axis CA than the edges of the second straight parts 32 on the side near the winding center axis CA. In this modification, the areas over which the first lead-out electrode 140 and the second lead-out electrode 150 are exposed from the mounting surface 21 can be increased, and therefore, the inductor component 110 is more easily mounted on a substrate.

Regarding the position of the first lead-out electrode 40, when looking in the height direction Td, one corner out of the four corners of the square shape of the first lead-out electrode 40 does not have to be aligned with a corner where an imaginary plane containing the first end surface 23 and an imaginary plane containing the first side surface 25 are connected to each other. The first lead-out electrode 40 may be exposed from at least the mounting surface 21, the first end surface 23, and the first side surface 25. For example, part of the first lead-out electrode 40 may be disposed nearer the first end in the length direction Ld than an imaginary plane containing the first end surface 23 and may be disposed nearer the first end in the width direction Wd than an imaginary plane containing the first side surface 25. This point similarly applies to the second lead-out electrode 50.

The dimensions of the first lead-out electrode 40 are not limited to the examples given in the embodiment. For example, the dimension of the first lead-out electrode 40 in the height direction Td may be less than or equal to ½ the dimension of the element body 20 in the height direction Td. Furthermore, the dimension of the first lead-out electrode 40 in the height direction Td may be equal to the dimension of the element body 20 in the height direction Td. In this case, the first lead-out electrode 40 is exposed at the top surface 22 of the element body 20 as well.

So long as the first lead-out electrode 40 has a columnar shape, the first lead-out electrode 40 may locally include parts that have a larger dimension in the height direction Td. In this case, it is suitable that the maximum dimension of the first lead-out electrode 40 in the height direction Td be less than or equal to ½ the dimension of the element body 20 in the height direction Td. The maximum dimension may be measured by performed electron microscopy on a cross-section perpendicular to the mounting surface 21 including the part where the dimension is larger in the height direction Td.

The positional relationship between the first lead-out electrode 40 and the inductor wiring 30 is not limited to the example in the embodiment. For example, the first lead-out electrode 40 does not have to overlap the inductor wiring 30 when looking in the length direction Ld. In this case, the element body 20 can be disposed at a location that the inductor wiring 30 does not overlap the first lead-out electrode 40 when looking in the length direction Ld. As a result, the volume of the element body 20 of the inductor component 10 can be increased.

The shape of the second lead-out electrode 50 does not have to be the same as that of the first lead-out electrode 40. In addition, the positional relationship between the second lead-out electrode 50 and the first lead-out electrode 40 is not limited to the example given in the embodiment. In other words, the second lead-out electrode 50 and the first lead-out electrode 40 do not have to be in a positional relationship having two-fold symmetry with the center of the element body 20 being the center of rotational symmetry when looking in the height direction Td.

The element body 20 does not have to be completely formed of the same material, and for example, only the surface layers of the first side surface 25 and the second side surface 26 may be colored. In this case, it is easy to see whether or not the mounting surface 21 of the inductor component 10 is facing toward the circuit board when mounting the inductor component 10.

The structure of the first coating layer 70 is not limited to the example given in the embodiment. For example, the first coating layer 70 may be formed by plating, by applying a metal paste and sintering the metal paste, or may consist only of the tin layer 72. In addition, the first coating layer 70 may be omitted. In the case where the first coating layer 70 is omitted, the part of the first lead-out electrode 40 that is exposed from the element body 20 functions as a terminal part for a substrate and so forth. This point similarly applies to the second coating layer 80.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

an element body comprising an insulator, the element body having a mounting surface and a top surface that are parallel to each other, a first end surface and a second end surface that are parallel to each other, and a first side surface and a second side surface that are parallel to each other;

an inductor wiring disposed inside the element body, the inductor wiring being shaped like a coil wound inside the element body, and a center axis of winding of the inductor wiring being perpendicular to the first side surface;

a first lead-out electrode connected to a first end of the inductor wiring, the first lead-out electrode having a columnar shape that extends in a direction perpendicular to the mounting surface and being exposed from the first end surface and the first side surface, an upper end of the first lead-out electrode being flush with an upper surface of a straight part of the inductor wiring; and a second lead-out electrode connected to a second end of the inductor wiring, wherein part of the first lead-out electrode and part of the second lead-out electrode are exposed from the mounting surface, a portion of the first side surface abuts and extends along the first lead-out electrode from an upper surface of the first lead-out electrode to the mounting surface of the element body, a portion of the first end surface abuts and extends along the first lead-out electrode from the upper surface of the first lead-out electrode to the mounting surface of the element body, and the first lead-out electrode is not exposed from the second end surface and the second side surface.

2. The inductor component according to claim 1, wherein a maximum dimension of the first lead-out electrode in a direction perpendicular to the mounting surface is greater than ½ a dimension of the first end surface in a direction perpendicular to the mounting surface.

3. The inductor component according to claim 1, wherein the first lead-out electrode has a quadrangular columnar shape, and a dimension, in a direction perpendicular to the first side surface, of a part of the first lead-out electrode exposed from the first end surface is less than or equal to ¼ a dimension of the first end surface in a direction perpendicular to the first side surface.

4. The inductor component according to claim 1, wherein the first lead-out electrode has a quadrangular columnar shape, and a dimension of the first lead-out electrode in a direction perpendicular to the first end surface is greater than or equal to 10 μm.

5. The inductor component according to claim 1, wherein a first coating layer is stacked on at least a surface of the first lead-out electrode that is exposed from the mounting surface.

6. The inductor component according to claim 5, wherein the first coating layer includes a nickel layer stacked on a surface of the first lead-out electrode that is exposed from the element body, and a tin layer stacked on a surface of the nickel layer.

7. The inductor component according to claim 1, wherein the second lead-out electrode has a columnar shape that extends in a direction perpendicular to the mounting surface, and is exposed from the second end surface and the second side surface.

8. The inductor component according to claim 7, wherein a shape of the second lead-out electrode is identical to a shape of the first lead-out electrode, and the second lead-out electrode is exposed from the element body at a two-fold rotationally symmetrical position, with respect to a position where the first lead-out electrode is exposed from the element body, with a center of the mounting surface being a center of rotation and a direction perpendicular to the mounting surface being an axis of rotation.

9. The inductor component according to claim 1, wherein the first lead-out electrode does not overlap the inductor wiring when looking in a direction perpendicular to the first end surface.

10. The inductor component according to claim 1, wherein the first lead-out electrode overlaps the inductor wiring only in a region of the first end surface nearer the first side surface than a center of the first end surface.

11. An inductor component comprising:

an element body comprising an insulator, the element body having a mounting surface and a top surface that are parallel to each other, a first end surface and a second end surface that are parallel to each other, and a first side surface and a second side surface that are parallel to each other;

an inductor wiring disposed inside the element body;

a first lead-out electrode connected to a first end of the inductor wiring, the first lead-out electrode having a columnar shape that extends in a direction perpendicular to the mounting surface and being exposed from the first end surface and the first side surface; and a second lead-out electrode connected to a second end of the inductor wiring, wherein part of the first lead-out electrode and part of the second lead-out electrode are exposed from the mounting surface, a portion of the first side surface abuts and extends along the first lead-out electrode from an upper surface of the first lead-out electrode to the mounting surface of the element body, a portion of the first end surface abuts and extends along the first lead-out electrode from the upper surface of the first lead-out electrode to the mounting surface of the element body, the first lead-out electrode is not exposed from the second end surface and the second side surface, the inductor wiring is shaped like a coil wound inside the element body, a center axis of winding of the inductor wiring is perpendicular to the first side surface, and the first lead-out electrode and part of the inductor wiring overlap when looking in a direction in which the center axis extends.

12. The inductor component according to claim 11, wherein an extension direction of the first lead-out electrode and an extension direction of the inductor wiring are parallel to each other at an overlapping location, and an edge, which is on a side near the center axis, of the first lead-out electrode is located nearer the center axis than an edge, on a side near the center axis, of the part of the inductor wiring at the overlapping location when looking in the direction in which the center axis extends.

13. The inductor component according to claim 11, wherein in a direction perpendicular to the mounting surface, a distance from the top surface to an end, which is on a side near the top surface, of the first lead-out electrode, a distance from the top surface to an end, which is on a side near the top surface, of the inductor wiring, and a distance from the mounting surface to an end, which is on a side near the mounting surface, of the inductor wiring are all from 10 μm to 20 μm.

14. An inductor component comprising:

an element body having a mounting surface and a top surface that are parallel to each other, a first end surface and a second end surface that are parallel to each other, and a first side surface and a second side surface that are parallel to each other;

an inductor wiring disposed inside the element body;

a first lead-out electrode connected to a first end of the inductor wiring, the first lead-out electrode having a columnar shape that extends in a direction perpendicular to the mounting surface and being exposed from the first end surface and the first side surface; and a second lead-out electrode connected to a second end of the inductor wiring, wherein part of the first lead-out electrode and part of the second lead-out electrode are exposed from the mounting surface, the inductor wiring is shaped like a coil wound inside the element body, a center axis of winding of the inductor wiring is perpendicular to the first side surface, the first lead-out electrode and part of the inductor wiring overlap when looking in a direction in which the center axis extends, an extension direction of the first lead-out electrode and an extension direction of the inductor wiring are parallel to each other at an overlapping location where the first lead-out electrode and the part of the inductor wiring overlap when looking in the direction in which the center axis extends, and an edge, which is on a side near the center axis, of the first lead-out electrode and an edge, which is on a side near the center axis, of the inductor wiring are aligned at the overlapping location when looking in the direction in which the center axis extends.

15. The inductor component according to claim 14, wherein the second lead-out electrode has a columnar shape that extends in a direction perpendicular to the mounting surface, and is exposed from the second end surface and the second side surface, and when looking in the direction in which the center axis extends, a distance between the first lead-out electrode and the second lead-out electrode is equal to an inner diameter of the inductor wiring along a straight line passing through the center axis and perpendicular to the first end surface.

16. The inductor component according to claim 15, wherein the inductor wiring includes a first straight part that is disposed nearer the first end surface than a center of the element body and extends in a direction perpendicular to the mounting surface, and a second straight part that is disposed nearer the second end surface than the center of the element body and extends in a direction perpendicular to the mounting surface, and an inner diameter of the inductor wiring along a straight line that passes through the center axis and is perpendicular to the first end surface is greater than an inner diameter of the inductor wiring along a straight line that passes through the center axis and is perpendicular to the mounting surface, and is equal to a distance between the first straight part and the second straight part.

17. The inductor component according to claim 16, wherein the inductor wiring includes a third straight part that is disposed nearer a side opposite the mounting surface than the center of the element body and that extends in a direction perpendicular to the first end surface, and a fourth straight part that is disposed nearer the mounting surface than the center of the element body and that extends in a direction perpendicular to the first end surface, and the first straight part, the second straight part, the third straight part, and the fourth straight part are disposed on a plane parallel to the first side surface inside the element body.

18. The inductor component according to claim 17, wherein surfaces of a connection part between the first straight part and the third straight part, a connection part between the first straight part and the fourth straight part, a connection part between the second straight part and the third straight part, and a connection part between the second straight part and the fourth straight part that are on a side near the center axis are curved surfaces.

* * * * *